US012501227B1

(12) United States Patent
Schroeder et al.

(10) Patent No.: US 12,501,227 B1
(45) Date of Patent: Dec. 16, 2025

(54) SIMPLIFIED MESHES FOR ACOUSTICS

(71) Applicant: Apple Inc., Cupertino, CA (US)

(72) Inventors: Dirk Schroeder, San Jose, CA (US); Baptiste Angles, Sunnyvale, CA (US); Ming Chuang, Bellevue, WA (US)

(73) Assignee: Apple Inc., Cupertino, CA (US)

( * ) Notice: Subject to any disclaimer, the term of this patent is extended or adjusted under 35 U.S.C. 154(b) by 347 days.

(21) Appl. No.: 18/092,644

(22) Filed: Jan. 3, 2023

Related U.S. Application Data

(60) Provisional application No. 63/296,542, filed on Jan. 5, 2022.

(51) Int. Cl.
*H04S 7/00* (2006.01)

(52) U.S. Cl.
CPC .............. *H04S 7/301* (2013.01); *H04S 7/303* (2013.01); *H04S 2420/01* (2013.01)

(58) Field of Classification Search
CPC ....... H04S 7/301; H04S 7/303; H04S 2420/01
USPC ......................................................... 381/303
See application file for complete search history.

(56) References Cited

U.S. PATENT DOCUMENTS

2018/0232471 A1* 8/2018 Schissler ............. G06F 18/2413

* cited by examiner

*Primary Examiner* — Paul Kim
*Assistant Examiner* — Douglas J Suthers
(74) *Attorney, Agent, or Firm* — Thompson Hine LLP

(57) ABSTRACT

Various implementations disclosed herein include devices, systems, and methods that provide realistic acoustic simulation for sound from a virtual source based on a site specific 3D acoustic model of a physical environment. Some implementations obtain first sensor data representing at least a portion of a first boundary of a physical environment while second sensor data corresponding to a second boundary of the physical environment is absent from the first sensor data. In some implementations, the second boundary of the physical environment is estimated based on the first sensor data. Then, a 3D acoustic model representing the physical environment is determined, where the 3D acoustic model includes a 3D shape formed of at least the first boundary and the second boundary. In some implementations, acoustics are provided for sound from a virtual source corresponding to a position within the physical environment, where the acoustics are provided based the 3D acoustic model.

20 Claims, 6 Drawing Sheets

SIMPLIFIED MESHES FOR ACOUSTICS

CROSS-REFERENCE TO RELATED APPLICATIONS

This application claims the benefit of U.S. Provisional Application Ser. No. 63/296,542 filed Jan. 5, 2022, which is incorporated herein in its entirety.

TECHNICAL FIELD

The present disclosure generally relates to acoustic simulation for electronic devices, and in particular, to systems, methods, and devices that provide site specific acoustic simulation for sound from a virtual source in a physical environment based on a 3D acoustic model of the physical environment.

BACKGROUND

Realistic acoustic simulation relies on understanding the site specific surrounding physical environment (e.g., size or volume of the room, furniture placement, etc.). Existing computing systems, sensors and applications do not adequately simulate site specific acoustics for sound from a virtual source in an unknown or incomplete physical environment.

SUMMARY

Various implementations disclosed herein include devices, systems, and methods that enable realistic acoustics for simulated sound from a virtual sound source in a physical environment based on a 3D acoustic model of the physical environment. The 3D acoustic model provides acoustic simulation for the virtual sound source that is site specific for a surrounding physical environment. In some implementations, the 3D acoustic model provides a physics-based acoustic simulation that is site specific for the surrounding physical environment. The acoustic simulations may be based on a 3D acoustic model such as a 3D model representing an estimated shape and/or estimated volume of the physical environment. In some implementations, the realistic acoustics are provided quickly (e.g., soon after initial sensor data about the physical environment is obtained) by generating an initial 3D acoustic model based on an initial set of sensor data. For example, the initial set of sensor data can be a single keyframe corresponding to only a portion of the physical environment (e.g., a wall in a room). In some implementations, the initial set of sensor data is combined with statistics of room types, room volumes or shapes, room type acoustics, or machine learning (ML) model-based estimation of first shapes, etc. In some implementations, the 3D acoustic model is updated over time to improve the acoustic simulations as more sensor data (e.g., more keyframes, semantic information, other sensor data, etc.) of the physical environment is obtained. In some implementations, the 3D acoustic model includes acoustic information of surfaces such as materials (e.g., acoustic absorption), shape (e.g., acoustic scattering), structural behavior (e.g. airborne sound insulation), etc.

In some implementations, one or many 3D acoustic model is (a) simpler than 3D models used for other purposes (e.g., visual 3D geometry), (b) a lower complexity model with a small number of unique planes, (c) wavelength dependent for objects (e.g., omits small objects in or small features of the physical environment), (d) wavelength dependent for surfaces (e.g., flattens acoustic representations of surfaces of the physical environment, (e) is provided quickly using an estimated 3D shape and volume, (f) preserving a volume of the physical environment; (g) a custom-made geometrical representation of the physical environment (e.g., no gaps or holes that do not exist in the physical environment); and/or (h) preserving overall basic shape of the physical environment.

In general, one innovative aspect of the subject matter described in this specification can be embodied in methods that include the actions where first sensor data is obtained representing at least a portion of a first boundary of a physical environment while second sensor data corresponding to a second boundary of the physical environment is absent from the first sensor data. Then, the second boundary of the physical environment is estimated based on the first sensor data. In some implementations, a 3D acoustic model representing the physical environment is determined, where the 3D acoustic model includes a 3D shape formed of at least the first boundary and the estimated second boundary. Then, acoustics for sound from a virtual source corresponding to a position within the physical environment are provided, where the acoustics are provided based the 3D acoustic model representing the physical environment.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
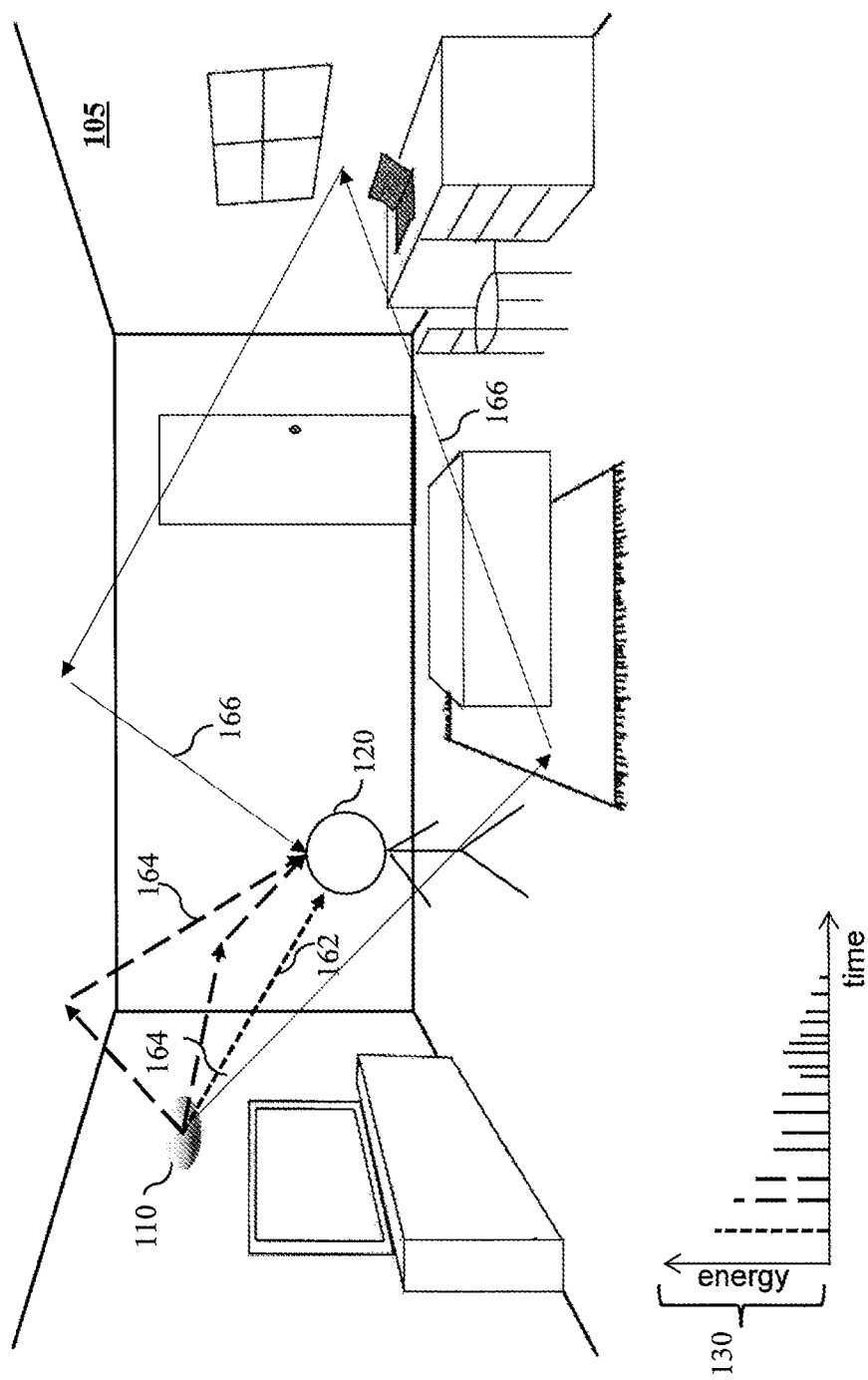
FIG. 1 is a diagram that illustrates exemplary physics-based acoustic modeling for a physical environment.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that initially estimate volume and shape of a physical environment based on initial sensor data (e.g., a keyframe) representing a portion of the physical environment and generate a 3D acoustic model based on the initial estimation. The 3D acoustic model for the physical environment (e.g., room) may be updated as additional sensor data is obtained. In some implementations, the volume, shape, and acoustic material estimation of the physical environment is estimated based on statistics (e.g., average room dimensions and statistical room material acoustics data for various room types) and the information in the initial sensor data. In some implementations, the initial sensor data represents a portion of the physical environment and ML model-based estimations of a first proxy geometry for the 3D acoustic model are based on the initial sensor data. For example, the initial sensor data can be image and depth data for a view or a portion of the physical environment (e.g., a stove) and an initial 3D acoustic model of the physical environment may be determined based on determining that the room is a kitchen, identifying statistical information associated with kitchens, and estimating the room's shape, volume, and acoustic materials given what is known from the initial sensor data and what can be estimated about other portions of the room based on the room's type and the statistical information or ML model-based estimations of a first proxy geometry. In some implementations, the 3D acoustic model for the physical environment includes a geometrical representation (e.g., a 3D mesh) and an acoustic surface parameterization (e.g., acoustic absorption, acoustic scattering, airborne sound insulation, etc.).

The 3D acoustic model of the physical environment enables realistic acoustic simulations for sound from a virtual sound source placed in the physical environment for a user of the electronic device in the physical environment. In some implementations, the 3D acoustic model enables real time, immediate acoustic simulations tailored to the specific physical environment for virtual sounds generated for a user of an electronic device in that specific physical environment.

Acoustic simulations for a physical environment may be provided based on a 3D acoustic model that is determined based on assessing the structure of the physical environment (e.g., size or volume of the room, constructional elements such as walls, floors, ceilings, position and type of furniture, semantics, etc.). The 3D acoustic model enables acoustic simulation for the virtual sound source that is site specific for a surrounding physical environment. In some implementations, the 3D acoustic model provides physics-based acoustic simulations that are site specific for the surrounding physical environment. However, the 3D acoustic model is not intended to be so limited and other implementations of acoustic propagation modeling may be used for the acoustic simulation for the virtual sound source that is site specific for a surrounding physical environment.

FIG. 1 is a diagram that illustrates exemplary physics-based acoustic modeling based on a 3D model of a physical environment. As shown in FIG. 1, exemplary acoustic ray tracing can provide physics-based acoustic modeling and can represent a single virtual sound source 110 heard by a single person (e.g., receiver) 120 located in a physical environment 105. In some implementations, physics-based acoustic modeling based on the 3D acoustic model may divide sound propagation into three parts including (i) direct sound, (ii) early reflections, and (iii) late reverberations. In FIG. 1, the direct sound is illustrated as a single path drawn using short dashed lines 162. The early reflections are illustrated as several ray tracings represented by several paths drawn using long dashed lines 164. Then, late reverb is represented by very many paths drawn using solid lines 166. For example, the direct sound has no reflections (e.g., occlusions in the direct path need to be modeled), the early reflections include one or more reflections but less reflections than the late reverb, which can reflect any number of times, e.g., 20, 50, 100, many hundred thousand times, etc.) before arriving at the person 120. A chart 130 illustrates an exemplary relationship between energy and timing of the direct sound, the early reflections, and the late reverb for the physical environment 105. Acoustic modeling based on a 3D model of a physical environment is not intended to be limited to ray-tracing physics-based acoustic modeling (e.g., see FIG. 1) or even physics-based acoustic modeling and other implementations of acoustic propagation modeling may be used for simulated acoustics modeling based on a 3D model of a physical environment.

An estimated frequency range that people can hear is from 20 hertz to 20 kilohertz. The wavelength of a 20 Hertz signal is about 20 meters. The wavelength of a 20 kilohertz signal is less than 2 centimeters. Accordingly, interactions in a physical environment of the 20 hertz signal, the 20 kilohertz signal, and wavelengths in-between are very different. For example, a 20 Hertz signal will not reflect off but diffract around a coffee cup, but a 20 kilohertz signal will reflect off a coffee cup.

In some implementations, the goal of a 3D acoustic model for a physical location is to render a virtual sound source placed in the physical environment so that sounds from the virtual source very closely mimic (e.g., is perceived to be the same as, matches a room impulse response, etc.) a real sound source in that physical environment.

Figure 2:
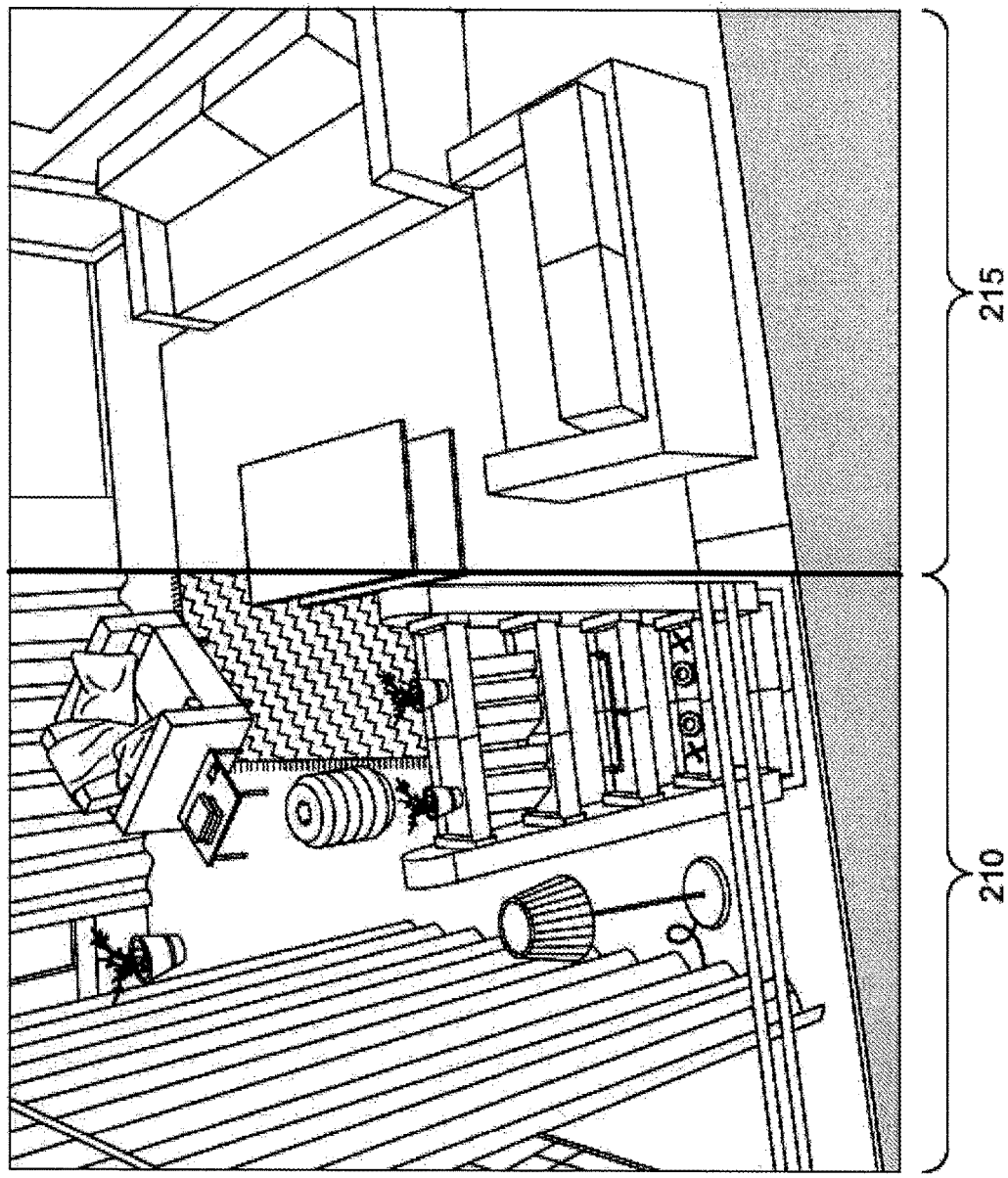
FIG. 2 is a diagram that illustrates an exemplary acoustic geometry for a physical environment in accordance with some implementations.

FIG. 2 is a diagram that illustrates an exemplary acoustic geometry for a physical environment in accordance with some implementations. FIG. 2 illustrates a perspective view where a first portion 210 illustrates a visual appearance of a first part of a physical environment 205 and a second portion 215 illustrates acoustic geometry that can represent a second part of the physical environment 205.

In some implementations, the 3D acoustic model for a specific physical environment includes the geometrical representation (e.g., a 3D mesh) and the acoustic surface parameterization (e.g., acoustic absorption, acoustic scattering, airborne sound insulation, etc.). In some implementations, the 3D acoustic model is (a) simpler than 3D models used for other purposes (e.g., visual 3D geometry), (b) a lower complexity model with a small number of unique planes, (c) wavelength dependent for objects (e.g., omits small objects in or small features of the physical environment, (d) wavelength dependent for surfaces (e.g., flattens acoustic representations of surfaces of the physical environment, (e) provided quickly using an estimated 3D shape and volume (e.g., see a first stage 342 of the 3D acoustic model), (f) preserving a volume of the physical environment; (g) a custom-made geometrical representation of the physical environment (e.g., no gaps or holes that do not exist in the physical environment); and/or (h) preserving overall basic shape of the physical environment.

In some implementations, a 3D acoustic model includes additional information such as information about surface characteristics of surfaces modeled in the 3D acoustic model. The 3D acoustic model may be generated based on determining absorption (e.g., material), scattering (e.g., shape), and structural behavior (e.g., sound reduction through structural elements) of surfaces of the 3D model. Absorption is related to materials of the surface. Scattering is related to the shape of the surface. Structural elements describe the reduction in sound transmission through a structural element such as walls, windows, and doors when excited by airborne sound. The 3D acoustic model may represent absorption and scattering to account for specular reflections (e.g., uniform reflections) that occur when the sound waves encounter large smooth surfaces and irregular non-specular reflections (e.g., scattering) caused by non-uniform shapes in the physical environment.

In some implementations, materials represented in the 3D acoustic model may be used to determine an amount or percentage of sound that is absorbed or scattered (e.g., when an acoustic ray impacts a surface or transmitted). In some implementations, as the acoustic characteristics of the physical environment are detected/determined, the acoustic characteristics or acoustic materials can be mapped to surfaces in the 3D acoustic model.

In some implementations, the 3D acoustic model is acoustic wavelength dependent. In some implementations, a shape and size of objects in the physical environment are determined and only objects that are over a predetermined size or threshold (e.g., have any detectable dimension greater than the threshold) are represented in the 3D acoustic model. In some implementations, small objects that are not larger than the threshold in any detected dimensions (e.g., height, width, depth, volume) may be reduced, removed, or omitted from the 3D acoustic model in some implementations. Similarly, in some implementations, surfaces in the acoustic model can be flattened as small corrugations determined in surfaces of the physical environment are reduced, removed, or replaced by one or more flat surfaces in the 3D acoustic model.

In some implementations, the small objects are removed by collapsing the small objects onto a flattened planar surface in the wavelength dependent 3D acoustic model. For example, below a selected frequency (increasing wavelength), the flattened surface (e.g., removed small object) is modeled flat in the wavelength dependent 3D acoustic model, but above that frequency a scattering parameter is applied to the flattened surface, which describes the amount of sound energy that gets scattered by the smaller objects previously on the flattened surface, and now omitted in the wavelength dependent 3D acoustic model (e.g., 3D geometric mesh). The 3D acoustic models may be generated by removing representations of objects that affect frequencies above an upper threshold directly related to a selected wavelength. In some implementations, the threshold can be any detectable dimension such as height, width, or depth greater than 0.5-1 meter, volume greater than 0.5-1 m³. This may increase the accuracy of acoustics provided based on the 3D acoustic model in low-frequency and mid-frequency ranges, e.g., ranges that may include may human voice and music sounds (e.g., a frequency range of interest).

In some implementations, the 3D acoustic model is a lower complexity model with a small preset number of unique planes. In some implementations, the relatively low overall complexity of the 3D acoustic model increases accuracy and/or reduces processing/storage requirements.

In some implementations, the 3D acoustic model for a specific physical environment includes the geometrical representation that accurately represents the physical environment (e.g., no gaps or holes that do not exist in the physical environment). For example, real-world openings in the physical environment such as an open door (e.g., a door frame) should be detected/determined and not get closed in the 3D acoustic model. In this case, the 3D acoustic model allows traced acoustic energy that travels through the door frame to be appropriately modeled to enable sound propagation into neighboring physical environments (e.g., adjacent rooms that can be estimated from partial scans through the door frame into the neighboring room). Thus, some of the traced acoustic energy that travels through the door frame will bounce back into the physical environment. In another example, the traced acoustic energy that travels through a real-world opening (e.g., open exterior door frame or open exterior window frame) in the physical environment may not return from an adjacent outdoor physical environment. However, the geometrical representation in the 3D acoustic model should not contain holes or gaps that do not exist in in the physical environment, e.g. a gap in a corner of two connecting walls, holes in an acoustic representation of continuous ceiling in the physical environment, etc.

An enclosed volume representing the physical environment can be a feature in the 3D acoustic model. For example, the reverberation time is related to the enclosed volume of the physical environment and average absorption area. In some implementations, the reverberation time characteristic is an acoustic characteristic of the 3D acoustic model that can be matched so that there is not a perceptible difference between a virtual sound generated for the physical environment and a physical sound source in the physical environment. In some implementations, the volume of the physical environment is accurately represented by the 3D acoustic model within a prescribed threshold. In some implementations, the volume of the physical environment is accurately represented by the 3D acoustic model within +/−10%. In some implementations, the 3D acoustic model represents a closed 3D shape in order to provide virtual acoustics for the physical environment. Similarly, the physical environment shape in the 3D acoustic model can be used to accurately provide the early reflection patterns of the physical environment in the 3D acoustic model.

In some implementations, the 3D acoustic model includes semantic labels for modeled surface(s) of the physical environment. For example, semantic labels for a piece of furniture could identify the object, the materials, the acoustic materials represented in the 3D model, the shape, the size, the positioning, and the like.

In some implementations, the 3D acoustic model includes acoustic characteristics of virtual objects. In some implementations, the 3D acoustic model includes acoustic characteristics of virtual objects in an extended reality (XR) environment corresponding to the physical environment. In some implementations, virtual objects that are under a predetermined size or threshold (e.g., have no detectable dimensions greater than the threshold) are reduced, removed, or replaced in the wavelength dependent 3D acoustic model. Similarly, in some implementations, small corrugations determined in surfaces of the virtual objects are reduced, removed, or replaced by one or more flat surfaces in the 3D acoustic model.

Figure 3:
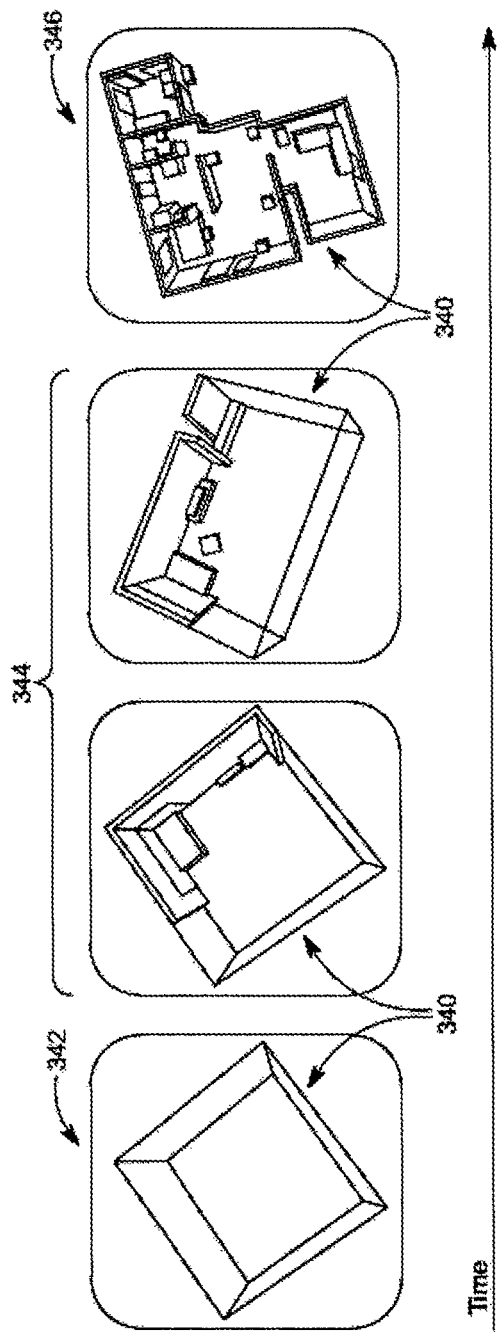
FIG. 3 is a diagram that illustrates an exemplary 3D acoustic model for a physical environment in accordance with some implementations.

FIG. 3 is a diagram that illustrates an exemplary 3D acoustic model for a physical environment. As shown in FIG. 3, a 3D acoustic model 340 for a physical environment changes over time as data of the physical environment is obtained. During a first stage 342, when an electronic device enters a new physical environment, the 3D acoustic model 340 is initially generated from an initial set of sensor data of the physical environment as an estimated 3D shape with an estimated volume. In some implementations, the estimated 3D shape and volume during the first stage 342 enables the provision of reasonable site-specific virtual sound quickly after the electronic device begins capturing sensor data in the physical environment.

In some implementations, the shape and volume of the physical environment are estimated in the first stage 342 based on a portion of the physical environment (e.g., less than all of the physical environment) represented in the initial set of sensor data. For example, the initial set of data can be a single RGB-D capture of a physical environment that has not been previously visited. In some implementations, the estimated 3D shape and volume is based on statistics and a portion of the physical environment represented in a single initial keyframe in the first stage 342. In some implementations, the estimated 3D shape and volume is based on statistics, a portion of the physical environment represented in a single initial keyframe, and a ML model-based proxy geometry in the first stage 342. In some implementations, dimensions (e.g., walls, floors, ceilings) determined from the initial set of sensor data are extended until the estimate 3D shape and volume (e.g., closed rectangular box) encompasses the determined volume. In some implementations, the initial estimated 3D shape and volume or bounding box is determined by scene intelligence such as semantic information or location information. For example, the initial set of data for the physical environment may include a location that determines a specific country, city, or structure being entered. In some implementations, a user can contribute to the initial set of data, for example, by identifying a type of environment, e.g., home, office, living room, etc. In some implementations there are statistics for internal physical locations by type (e.g., kitchen, bathroom, living room, bedroom) and geographic location (e.g., country, city, neighborhood, etc.).

In some implementations, an algorithm or machine learning (ML) model is used to estimate a first proxy geometry of a physical environment (e.g., room) based on initial sensor data from an electronic device in the physical environment. A ML model can be trained using ground truth initial sensor data (e.g., simulated or actual) generated for a range of specific physical environment types (e.g., and locations). For example, a ML model can be trained to output a number/size of openings, and number/size of boundaries for a 3D shape representing a physical environment based on an input initial sensor data. In another example, a ML model can be trained to output a 3D shape and volume representing a physical environment type based on an input initial sensor data. Once trained, the initial sensor data is input to the ML network and the corresponding first proxy geometry (e.g., an estimated number/size of openings and number/size of boundaries, a physical environment type) of a physical environment is output. In some implementations, the ML network is trained to output the first proxy geometry of a physical environment and a corresponding confidence measurement. The ML model can be, but is not limited to being, a deep neural network (DNN), an encoder/decoder neural network, a convolutional neural network (CNN), or a generative adversarial neural network (GANN).

As shown in FIG. 3, during a second stage 344, additional information (e.g., image data, depth data, statistical data, semantic data, additional sensor data, location data, etc.) is obtained for the physical environment and the 3D acoustic model 340 is altered. For example, as the user moves the electronic device during use, more regions of the room can be visible to the electronic device, allowing the electronic device to capture images and other sensor data of those additional regions of the room to obtain additional information about the room. This additional information can then be used to alter the 3D acoustic model 340 to include additional acoustic details such as wall positioning, furniture placement, semantic labels, and size in the second stage 344. In some implementations, additional detected information about portions of the physical environment are integrated during the second stage 344 into the 3D acoustic model 340.

As shown in FIG. 3, a third stage 346 of the 3D acoustic model 340 occurs after a prescribed threshold of acoustic information for the 3D acoustic model 340 is reached. For example, the third stage 346 occurs after the room has been scanned from all directions, after all boundaries of the room have been partially detected, after a preset percentage of room has been scanned, after acoustic characteristics for a preset portion or percentage of the 3D physical environment are included, or other completion criteria has been satisfied. In some implementations, the second stage 344 (e.g., intermediate stage) occurs between the first stage 342 and the third stage 346 the 3D acoustic model 340. In some applications, the 3D acoustic model 340 may be used to provide acoustics for virtual sound in a 3D environment after the 3D acoustic model 340 has reached a preset stage of completion (e.g., the second stage 344 or the third stage 346).

In some implementations, the estimated 3D shape of the 3D acoustic model remains continuous (e.g., no gaps or holes in the 3D mesh that do not exist in the physical environment) even as additional scanning provides additional sensor data about acoustic characteristics (e.g., environment dimensions, positioned objects, semantic information, materials, etc.) of the physical environment (see FIG. 3, 344, 346). In some implementations, the estimated 3D shape and volume of the 3D acoustic model remains continuous (e.g., no gaps or holes that do not exist in the physical environment) even as additional scanning provides additional sensor data about acoustic characteristics (e.g., environment dimensions, positioned objects, semantic information, materials, etc.) of additional interconnected or adjacent physical environments (e.g., the 3D acoustic model is extended by the new sensor data). In some implementations, 3D acoustic models (e.g., at different stages 342, 344, 346) for one or more standalone or interconnected physical environments can be retained for future visits to that physical environment.

In some implementations, 3D acoustic models are generated from live scan data including image sensor data, depth data, and scene intelligence such as semantic data. In some implementations, an electronic device within a physical environment can scan the physical environment and generate a XR environment based on images and/or other sensor data of the physical environment. The XR environment may be determined using various techniques, e.g., 3D point clouds, scale-invariant features, computer vision-based localization, simultaneous localization and mapping (SLAM), visual inertial odometry (VIO), etc. and may be based on sensor data, e.g., image data, depth data, motion data, audio data, semantic data, flicker sensor, ambient light sensor, etc. The location of the electronic device can be registered to the 3D XR environment.

Figure 4:
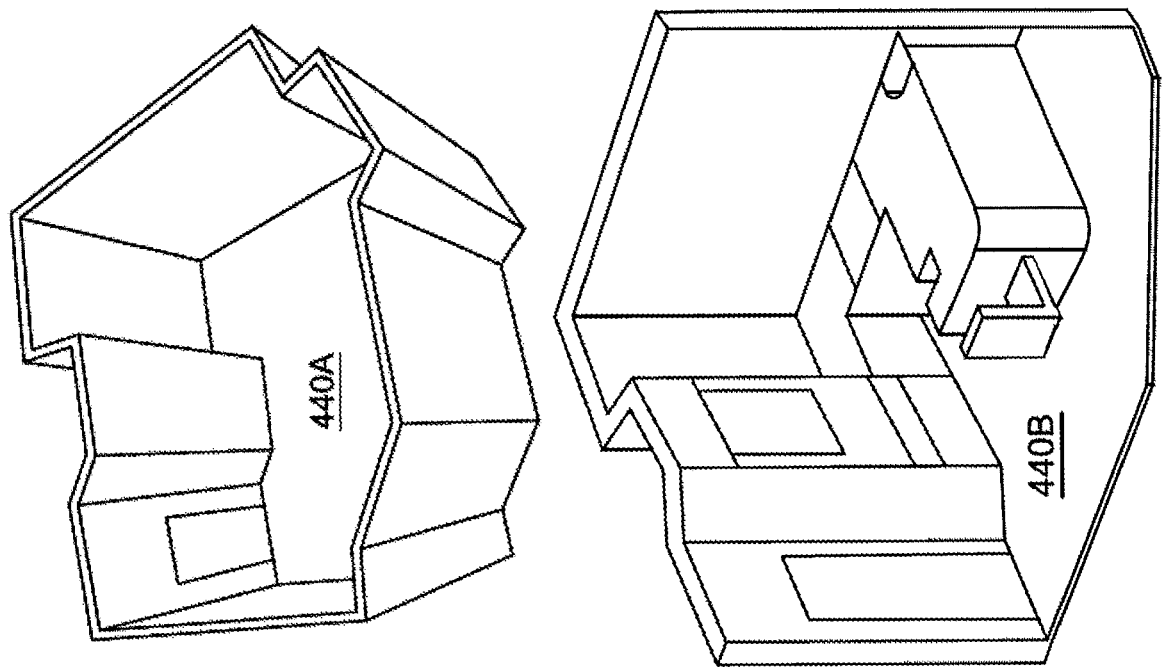
FIG. 4 is a diagram that illustrates portions of a 3D acoustic model are based on a reconstructed visual mesh of a physical environment in accordance with some implementations.
Figure 4:
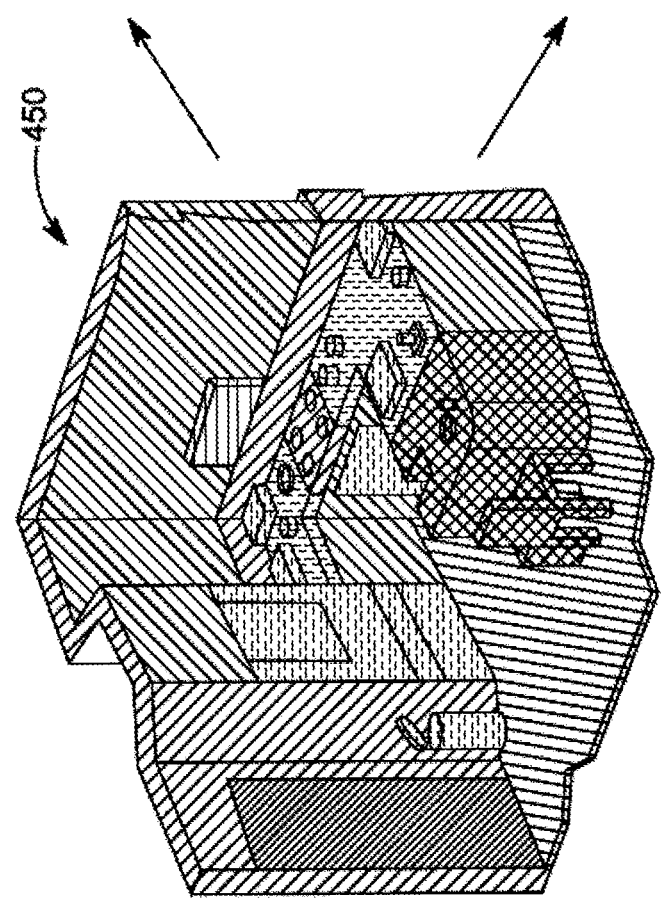

FIG. 4 is a diagram that illustrates portions of a 3D acoustic model are based on a reconstructed visual mesh of a physical environment. As shown in FIG. 4, constructional elements such as walls, ceilings, and floors can be extracted from a reconstructed mesh 450 and used to modify a 3D acoustic model 440A of a shape and size of a physical environment. Alternatively or additionally, as shown in FIG. 4, the reconstructed mesh 450 can be used to modify a 3D acoustic model 440B of objects in the physical environment and the shape and size of the physical environment. In some implementations, the objects in the 3D acoustic model 440B can be generated from the reconstructed mesh 450 using known image processing and 3D modeling techniques including segmentation and scene intelligence such as semantic information. As shown in FIG. 4, acoustic characteristics such as absorption (e.g., material) for the constructional elements and reconstructed objects in the 3D acoustic models 440A, 440B may be initially missing unless provided with the reconstructed mesh 450. In some implementations, acoustic material estimation (e.g., acoustic absorption, acoustic scattering, structural behavior), etc. for the constructional elements and reconstructed objects in the 3D acoustic models 440A, 440B is estimated based on statistics (e.g., statistical room material acoustics data for various room types).

Figure 5:
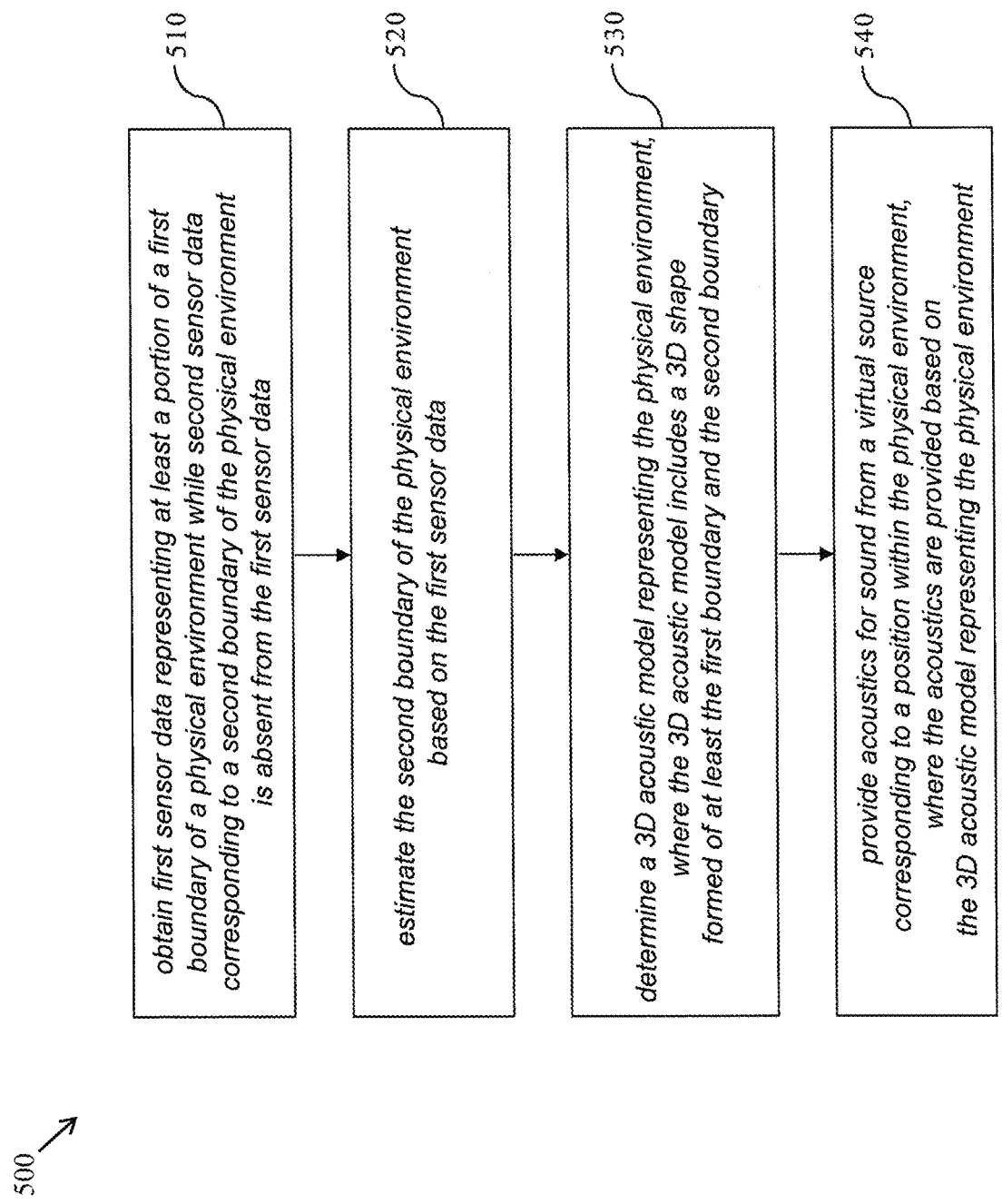
FIG. 5 is a flowchart illustrating an exemplary method that enables realistic acoustics for sound from a virtual source based on a 3D acoustic model of a physical environment in accordance with some implementations.

FIG. 5 is a flowchart illustrating an exemplary method that enables realistic acoustics for simulated sound from a virtual source based on a 3D acoustic model of a physical environment. The 3D acoustic model provides acoustic simulations for the virtual sound source that are site specific for a surrounding physical environment. In some implementations, the acoustics are provided quickly based on generating an initial 3D acoustic model (e.g., an estimated shape and volume) based on an initial set of sensor data. For example, the initial set of sensor data can be a single keyframe corresponding to only a portion of the physical environment. In some implementations, the 3D acoustic model is updated over time as more sensor data of the physical environment is obtained. In some implementations, the 3D acoustic model is wavelength dependent and omits, reduces, or deletes acoustic characteristics for detected objects or detected surface corrugations in the physical environment below respective threshold sizes. In some implementations, the method 500 is performed by a device (e.g., electronic device 600 of FIG. 6). The method 500 can be performed using an electronic device or by multiple devices in communication with one another. In some implementations, the method 500 is performed by processing logic, including hardware, firmware, software, or a combination thereof. In some implementations, the method 500 is performed by a processor executing code stored in a non-transitory computer-readable medium (e.g., a memory). In some implementations, the method 500 is performed by an electronic device having a processor.

At block 510, the method 500 obtains first sensor data representing at least a portion of a first boundary of a physical environment while second sensor data corresponding to a second boundary of the physical environment is absent from the initial sensor data. In some implementations, the first sensor data is image and depth data from a single keyframe. For example, the physical environment may be a room and the first sensor data may be RGB-D data for a wall/corner of the room directly in front of the electronic device while RGB-D data for the remaining portions of the room (e.g., behind the electronic device) including the second boundary are absent from the first sensor data.

At block 520, the method 500 estimates the second boundary of the physical environment based on the first sensor data. For example, the physical environment may be a room modeled by a closed rectangular shape with 6 sides. Portions of the ceiling, floor and three walls directly in front of the electronic device may be represented in the first sensor data and the second boundary is the wall behind the electronic device that is estimated or modeled initially without the second sensor data that is directly indicative of the position, shape, and/or other characteristics of the second boundary.

At block 530, the method 500 determines a 3D acoustic model representing the physical environment, where the 3D acoustic model includes a 3D shape formed of at least the first boundary and the second boundary. In some implementations, the 3D acoustic model including the 3D shape and estimated volume is based on the first boundary and the estimated second boundary. In some implementations, the 3D acoustic model including the 3D shape is based on the first sensor data. In some implementations, the shape and enclosed volume of the 3D shape representing the physical environment are estimated based on a portion of the physical environment represented in the first sensor data (e.g., a single, initial keyframe). As an example, if the electronic device captures part of a wall in an initial keyframe, the electronic device can estimate the shape and enclosed volume based on what is seen in that part of the wall. In some implementations, an algorithm can be used to estimate the shape and volume of the physical environment based on statistics, which can include data according to the average size of space based on room type, e.g., an office, a kitchen, a bedroom, etc. In some implementations, the first sensor data represents a portion of the physical environment and ML model-based estimations of a first proxy geometry for the 3D shape of the initial 3D acoustic model are based on the initial sensor data. For instance, referencing the example above, if the part of the wall that is captured by the electronic device shows a stove or an oven, the algorithm can determine that the room is a kitchen and reference the corresponding statistics (e.g., average size, number of openings such as doors, etc.) associated with a kitchen to determine the initial shape and volume. In addition to room type, other types of relevant information can be used to identify statistics for determining the initial shape and volume of the room. For instance, location information, building type information, public building information, and the like can be used to more accurately determine the initial size and volume of the room based on the initial keyframe. Location information may be useful in that buildings in different cities, states, and countries may have different average dimensions, building type information may be useful in that apartment buildings may have smaller average dimensions than single family homes, and public building information (e.g., neighborhood building floor plan templates) may be useful in that actual dimensions of certain rooms can be retrieved from public databases. In some implementations, semantic information in the initial keyframe can be used to determine the room type or other relevant information related to the initial shape and volume estimate of the room. In some implementations, acoustic surface parameterization (e.g., acoustic absorption, acoustic scattering, airborne sound insulation, etc.) of the 3D acoustic model of the physical environment is estimated based on statistics (e.g., average room dimensions and statistical room material acoustics data for various room types) and the information in the first sensor data.

In some implementations, dimensions (e.g., walls, floors, ceilings) determined from the first sensor data are extended or otherwise altered until a 3D shape (e.g., closed rectangular box) encompasses the determined volume. In some implementations, the 3D acoustic model of the physical environment generated from the first sensor data is updated as additional sensor data of the physical environment is obtained. In some implementations, the additional sensor data includes semantic information, additional keyframes, motion sensor data, position sensor data, location related statistics, acoustic sensor data, or data from additional sensors of the electronic device about the physical environment or an XR environment. For example, the additional sensor data of the physical environment can update the estimate of the shape and volume for the 3D acoustic model of the physical environment.

At block 540, the method 500 provides acoustics for sound from a virtual source corresponding to a position within the physical environment, where the acoustics are provided based on the 3D acoustic model representing the physical environment. In some implementations, the acoustics for the sound from the virtual source include physics-based rendering of direct sound, sound reflections, and reverberations corresponding to the position within the physical environment using the 3D acoustic model.

In some implementations, the method 500 obtains additional sensor data representing the physical environment and the 3D acoustic model is updated using the additional sensor data. For example, updating the 3D acoustic model can determine acoustic characteristics such as absorption (e.g., material), scattering (e.g., shape), and structural behavior (e.g., sound reduction through structural elements) for acoustic geometry identified in the 3D acoustic model. In some implementations, the 3D acoustic model generated from the first sensor data can be continually updated even after some sensor data for all portions of an interior of the 3D physical environment are included. For example, the immediately available 3D acoustic model can be continually updated even after sensor data corresponding to portions of all boundaries of the physical environment is obtained.

In some implementations, the method 500 uses the additional sensor data to include only objects in the physical environment that are over a predetermined size (e.g., have any detectable dimension such as height, width, or depth greater than a threshold size) in the wavelength dependent 3D acoustic model. In some implementations, only virtual objects visible in the physical environment over the predetermined size are represented in the wavelength dependent 3D acoustic model. In some implementations, the 3D acoustic model omits, reduces, or deletes detected physical objects or virtual objects visible in the physical environment below a threshold size in any detected dimension. In some implementations, small corrugations in surfaces of the detected physical objects or the virtual objects visible in the physical environment may be reduced, removed, or replaced by one or more flat surfaces in the 3D acoustic model.

In some implementations, a volume of the 3D acoustic model corresponds to a volume of the physical environment within a threshold. The 3D acoustic model can accurately represent the shape and size of the physical environment within preset tolerances.

In some implementations, the 3D acoustic model determines materials characteristics and shape characteristics for objects above a threshold size in at least one detectable dimension in an XR environment corresponding to the physical environment. In some implementations, the 3D acoustic model determines types and locations of virtual sound sources in an XR environment corresponding to the physical environment. In some implementations, the 3D acoustic model determines types and locations of sound sources in the physical environment.

In some implementations, the electronic device that provides the acoustics is a mobile electronic device, tablet electronic device, or laptop electronic device that tracks a 3D position (or pose) of a head of a user of the electronic device. In this case, the electronic device can use the 3D acoustic model to provide the acoustics for the sound from the virtual source based on an orientation of the user in the physical environment (e.g., a direction that the user is facing). In some implementations, the 3D position of the electronic device is tracked and correlated to a 3D position the user.

In some implementations, a 3D acoustic model is generated for each new physical environment that is entered by the electronic device. In some implementations, a first 3D acoustic model is generated when a first physical environment is entered by the electronic device and a second different 3D acoustic model is generated when a second physical environment is entered by the electronic device. The first and second 3D acoustic models can be retained or stored for future use by the electronic device or other electronic devices. In some implementations, when the electronic device leaves and re-enters the first (or second) physical environment, the retained first (or second) 3D acoustic model can be accessed and updated.

In some implementations, blocks 510-540 are repeatedly performed. In some implementations, the techniques disclosed herein may be implemented on a wearable device, such as a HMD having an optical see-through or opaque display.

Figure 6:
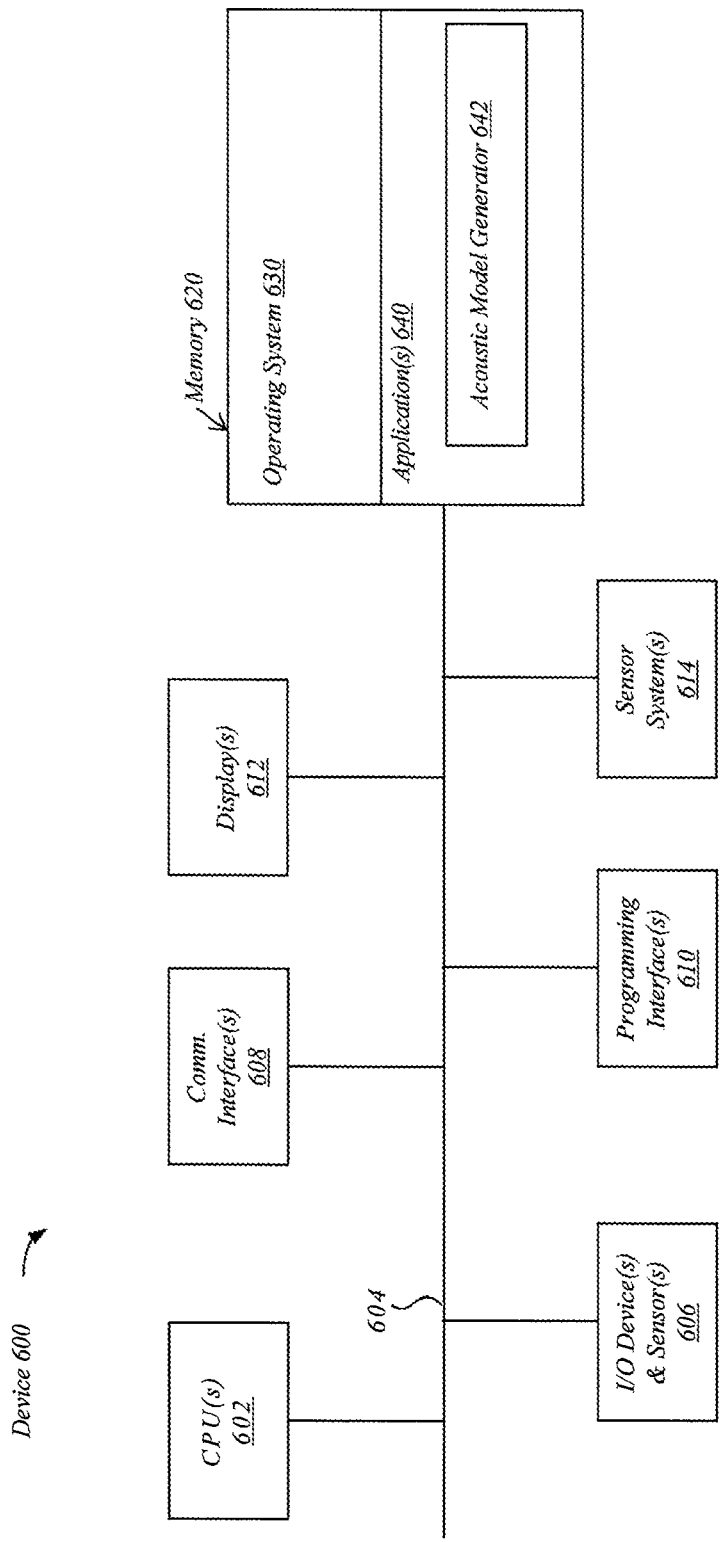
FIG. 6 illustrates an exemplary electronic device in accordance with some implementations.

FIG. 6 is a block diagram of an example device 600. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 600 includes one or more processing units 602 (e.g., microprocessors, ASICs, FPGAs, GPUs, CPUs, processing cores, or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 610, one or more displays 612, one or more interior or exterior facing sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 612 are configured to present content to the user. In some implementations, the one or more displays 612 correspond to holographic, digital light processing (DLP), liquid-crystal display (LCD), liquid-crystal on silicon object (LCoS), organic light-emitting field-effect transitory (OLET), organic light-emitting diode (OLED), surface-conduction electron-emitter display (SED), field-emission display (FED), quantum-dot light-emitting diode (QD-LED), microelectromechanical system (MEMS), or the like display types. In some implementations, the one or more displays 612 correspond to diffractive, reflective, polarized, holographic, etc. waveguide displays. For example, the electronic device 600 may include a single display. In another example, the electronic device 600 includes a display for each eye of the user.

In some implementations, the one or more sensor systems 614 include an image capture device or array that captures image data or an audio capture device or array (e.g., microphone) that captures audio data. The one or more image sensor systems 614 may include one or more RGB cameras (e.g., with a complimentary metal-oxide-semiconductor (CMOS) image sensor or a charge-coupled device (CCD) image sensor), monochrome cameras, IR cameras, or the like. The one or more sensor systems 614 may include inward or outward facing sensors. In some implementations, the one or more image sensor systems 614 further include an illumination source that emits light such as a flash. In some implementations, the one or more image sensor systems 614 further include an on-camera image signal processor (ISP) configured to execute a plurality of processing operations on the image data.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 includes a non-transitory computer readable storage medium.

In some implementations, the memory 620 or the non-transitory computer readable storage medium of the memory 620 stores an optional operating system 630 and one or more instruction set(s) 640. The operating system 630 includes procedures for handling various basic system services and for performing hardware dependent tasks. In some implementations, the instruction set(s) 640 include executable software defined by binary information stored in the form of electrical charge. In some implementations, the instruction set(s) 640 are software that is executable by the one or more processing units 602 to carry out one or more of the techniques described herein.

In some implementations, the instruction set(s) 640 include an acoustic model generator 642 that is executable by the processing unit(s) 602 to generate a 3D acoustic models for a physical environment that can provide acoustics for sound from a virtual source corresponding to a position within a physical environment according to one or more of the techniques disclosed herein.

Although the instruction set(s) 640 are shown as residing on a single device, it should be understood that in other implementations, any combination of the elements may be located in separate computing devices. FIG. 6 is intended more as a functional description of the various features which are present in a particular implementation as opposed to a structural schematic of the implementations described herein. As recognized by those of ordinary skill in the art, items shown separately could be combined and some items could be separated. For example, actual number of instruction sets and the division of particular functions and how features are allocated among them will vary from one implementation to another and, in some implementations, depends in part on the particular combination of hardware, software, or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
  at a processor of an electronic device:
    obtaining first sensor data representing at least a portion of a first wall of a physical environment while second sensor data corresponding to a second wall of the physical environment is absent from the first sensor data;
    estimating the second wall of the physical environment based on the first sensor data;
    determining a 3 dimensional (3D) acoustic model representing the physical environment, wherein the 3D acoustic model comprises a 3D shape formed of at least the first wall and the second wall; and providing acoustics for sound from a virtual source corresponding to a position within the physical environment, wherein the acoustics are provided based on the 3D acoustic model representing the physical environment.

2. The method of claim 1, wherein the first sensor data comprises image and depth data from a keyframe.

3. The method of claim 1, wherein the first sensor data comprises image and depth data for a portion of the physical environment, wherein the portion of the physical environment comprises the first wall of a room and remaining portions of the physical environment comprising the second wall opposite of the first wall of the room are absent from the first sensor data.

4. The method of claim 1, wherein the closed 3 dimensional (3D) shape comprises at least six connecting sides, and at least one side is absent from the first sensor data.

5. The method of claim 1, wherein the first sensor data comprises statistical databases related to types, dimensions, and initial acoustic materials of physical environments.

6. The method of claim 1, wherein determining the 3 dimensional (3D) acoustic model comprises:
  omitting detected objects in the physical environment below a threshold size in all detected dimensions; and
  determining materials characteristics and shape characteristics for the detected objects above the threshold size in at least one detected dimension.

7. The method of claim 1 further comprising:
  obtaining additional sensor data representing the physical environment; and
  updating the 3 dimensional (3D) acoustic model representing the physical environment based on the additional sensor data.

8. The method of claim 7, wherein the additional sensor data comprises semantic information, additional keyframes, motion sensor data, position sensor data, predetermined statistics, acoustic sensor data, or data from additional sensors of the electronic device about the physical environment or a corresponding extended reality (XR) environment.

9. The method of claim 7, further comprising repeating the obtaining additional sensor data and updating the 3 dimensional (3D) acoustic model.

10. The method of claim 1, further comprising determining surface acoustic parameters including absorption, scattering, structural sound reduction, and surface semantics for surfaces identified in the 3 dimensional (3D) acoustic model.

11. The method of claim 1, wherein the acoustics comprise site-specific physics-based simulated sound from the virtual source corresponding to the position within the physical environment based on the 3 dimensional (3D) acoustic model.

12. The method of claim 1, wherein the 3 dimensional (3D) acoustic model is acoustic wavelength dependent.

13. The method of claim 1, further comprising determining types and locations of virtual sound sources in an extended reality (XR) environment corresponding to the physical environment.

14. The method of claim 1, wherein the first sensor data comprises machine-learning based estimations of a first proxy geometry for a closed 3 dimensional (3D) shape for the 3D acoustic model based on the first sensor data.

15. The method of claim 1, wherein a volume of the 3 dimensional (3D) acoustic model corresponds to a volume of the physical environment.

16. The method of claim 1, wherein the 3 dimensional (3D) acoustic model is a 3D mesh that includes a predetermined limit of acoustic planes.

17. The method of claim 1, further comprising
  tracking a 3 dimensional (3D) position of the electronic device, wherein the electronic device is a tablet electronic device or laptop electronic device.

18. The method of claim 17, wherein a 3 dimensional (3D) position of a head of a user of the electronic device is correlated to the 3D position of the electronic device and the acoustics for the sound from the virtual source are based on an orientation and direction the user in the physical environment.

19. A system comprising:
  memory; and
  one or more processors at a device coupled to the memory, wherein the memory comprises program instructions that, when executed on the one or more processors, cause the system to perform operations comprising:
    obtaining first sensor data representing at least a portion of a first wall of a physical environment while second sensor data corresponding to a second wall of the physical environment is absent from the first sensor data;
    estimating the second wall of the physical environment based on the first sensor data;
    determining a 3 dimensional (3D) acoustic model representing the physical environment, wherein the 3D acoustic model comprises a 3D shape formed of at least the first wall and the second wall; and
    providing acoustics for sound from a virtual source corresponding to a position within the physical environment, wherein the acoustics are provided based on the 3D acoustic model representing the physical environment.

20. A non-transitory computer-readable storage medium, storing program instructions executable via one or more processors to perform operations comprising:
  obtaining first sensor data representing at least a portion of a first wall of a physical environment while second sensor data corresponding to a second wall of the physical environment is absent from the first sensor data;
  estimating the second wall of the physical environment based on the first sensor data;
  determining a 3 dimensional (3D) acoustic model representing the physical environment, wherein the 3D acoustic model comprises a 3D shape formed of at least the first wall and the second wall; and
  providing acoustics for sound from a virtual source corresponding to a position within the physical environment, wherein the acoustics are provided based on the 3D acoustic model representing the physical environment.

* * * * *